Figure 1:
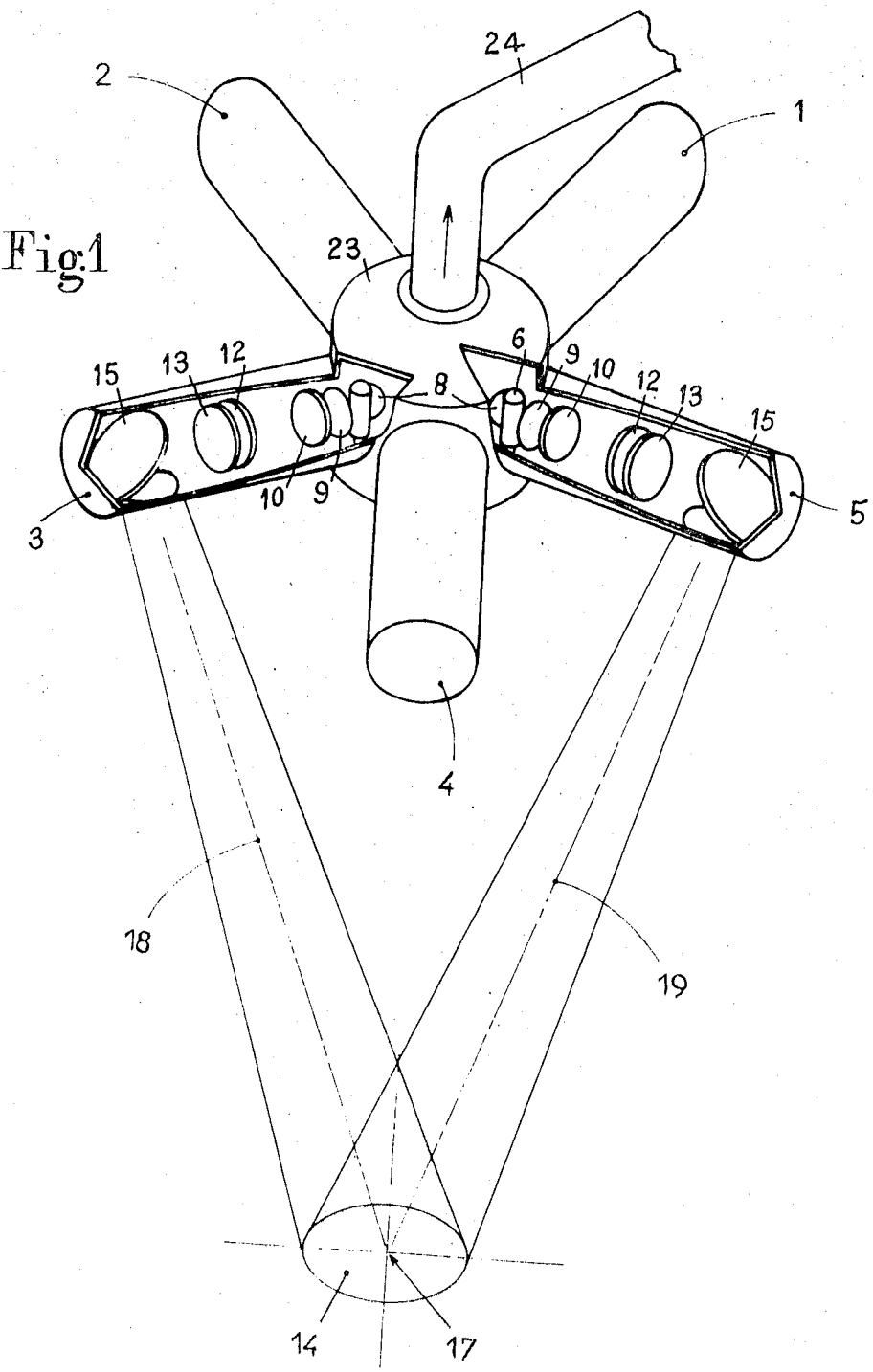

United States Patent [19]

Masson et al.

[11] 3,848,119
[45] Nov. 12, 1974

[54] LIGHTING PROJECTOR

[75] Inventors: André Masson, Saint Heand(Loire); Jack Joubert, Montluel(Ain), both of France

[73] Assignee: Establissements Pierre Angenieux, Paris, France

[22] Filed: July 16, 1973

[21] Appl. No.: 379,577

[30] Foreign Application Priority Data
July 27, 1972 France ............................ 72.65808

[52] U.S. Cl. ............................... 240/1.4, 240/41.15
[51] Int. Cl. ............................................. A61b 1/06
[58] Field of Search ............. 240/1.4, 3, 41.15, 41.1

[56] References Cited
UNITED STATES PATENTS
| | | | |
|---|---|---|---|
| 1,987,019 | 1/1935 | Logan | 240/41.15 X |
| 3,225,184 | 12/1965 | Reiber | 240/1.4 |
| 3,437,803 | 4/1969 | Seitz et al. | 240/1.4 |

*Primary Examiner*—Richard L. Moses
*Attorney, Agent, or Firm*—Michael S. Striker

[57] ABSTRACT

A lighting projector, particularly for surgical operating theatres or rooms, including a plurality of radially extending basic elements of substantially cylindrical configuration, centered on a common casing, each element comprising a light source illuminating a frosted zone, a wide-aperture optical condenser for concentrating the light power into a beam of relatively narrow cross-sectional area, a concave mirror located opposite said condenser and reflecting the radiated light, and an optical element forming an image of said frosted zone in the plane of use and determining a field of illumination after reflecting same by means of a mirror, the beams reflected by all the mirrors of said elements being received at a common area to be illuminated so as to minimize the cross-sectional obstruction area of the projector.

5 Claims, 2 Drawing Figures

LIGHTING PROJECTOR

The invention relates in general to lighting appliances and, more specifically an improved lighting projector intended particularly for surgical operating theatres or rooms.

The improved lighting projector according to the present invention is characterized primarily in that it is capable of eliminating or substantially eliminating cast shadows while providing a uniform illuminated area of high luminous intensity, with cold light and minimum cross-sectional obstruction area.

The obstruction area may be defined as a material surface area occupied by the complete appliance projected onto a horizontal plane.

As a rule, it is most advantageous to minimize this cross-sectional obstruction area in order to minimize the ventilation of the space in which the projector is installed. This advantage is particularly necessary in specific cases such as the illumination of operating theatres or rooms using a lamellar air flux.

Lighting projectors for operating theatres or rooms, of the type adapted to eliminate cast shadows, are already known, but they are objectionable on account of their very considerable cross-sectional obstruction area, whether in the case of appliances comprising a plurality of light sources, or in the case of projectors incorporating relatively large annular mirrors.

In the latter type of projector the obstruction could be reduced in comparison with the former, but it cannot be reduced in the proportion afforded by the present invention. Moreover, annular mirror assemblies deliver a relatively moderate luminous intensity in comparison with multiple-source projectors, since they can accomodate only one or two light sources.

The lighting projector according to the present invention comprises essentially the star-shaped arrangement of a limited number of basic elements each comprising, respectively, a light source illuminating a frosted zone, a wide-aperture optical condensing system capable of concentrating the maximum quantity of illuminating energy within a beam of relatively narrow cross-sectional area, a concave mirror located opposite said condenser and reflecting the light beams radiated from the source, and an optical element forming the image of the frosted zone in a utilization plane and capable of determining an illumination field after reflecting the beam by means of a suitably positioned mirror.

The projector according to this invention consists essentially of the star arrangement of a reduced number of basic elements each comprising each a light source illuminating a frosted zone, a wide-aperture optical condensing system capable of concentrating the maximum amount of light power into a beam of relatively reduced cross-sectional area, a concave mirror reflecting the radiated light power in the direction of the condenser, and an optical element forming the image of the frosted area in a plane of use determining an illumination field after reflecting the beam by means of a suitably positioned mirror.

Figure 2:
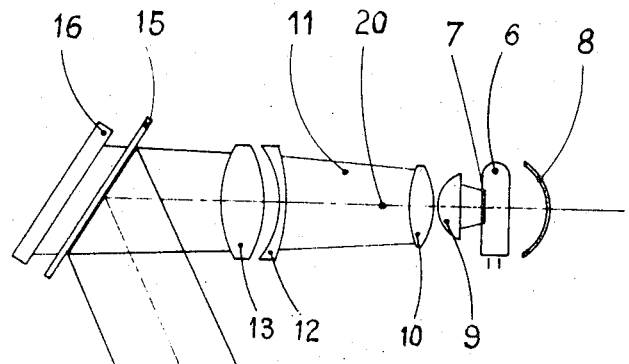

A typical embodiment of the lighting projector according to this invention will now be described with reference to the accompanying drawing, in which:

FIG. 1 is a diagrammatic perspective view of the projector, with parts broken away; and FIG. 2 is a diagrammatic view illustrating the mode of operation of one of the basic elements of the projector of this invention.

In the example illustrated the projector comprises five basic elements 1, 2, 3, 4 and 5 extending in radial directions at spaced angular intervals. Each basic element 1 – 5 is enclosed in a substantially tubular case and comprises, as shown diagrammatically in FIG. 2:

a light source 6 illuminating the frosted zone 7 disposed in close proximity of said source;

a condensing optical system of relatively high numerical-aperture, which comprises in the example of FIG. 2 a pair of lenses 9 and 10, and capable of producing the maximum concentration of the light power into a beam 11 of relatively reduced cross-sectional area;

a concave mirror 8 reflecting the radiating light power in the direction of said condenser;

an optical element comprising in said example a pair of lenses 12, 13 forming the image of said frosted zone in a plane 14 determining the illumination field, after reflecting the beam by means of a suitable mirror, and the reflecting mirror 15.

These various component elements are disposed in this order and sequentially from the centre of the appliance outwardly. The mirrors 15 are disposed at the outer ends and are properly inclined in order to cause the corresponding beams to converge towards a common area; in other words, the axes, such as 18 and 19, of these beams are located on spaced generatrices of a cone having its apex 17 coincident with the centre of the illuminated field 14.

Each one of the reflecting mirrors 15 of the various basic elements has four specific functions:

1. The mirrors are such that the basic elements 1 to 5 can be disposed in a spider— or star-like arrangement, with all the light sources 6 located in close vicinity of a central point in a common casing 23. This arrangement has the following advantages:
    a. it reduces the above-defined cross-sectional obstruction area;
    b. it improves if necessary the dissipation of the heat produced by the light sources, through a single or common member, for instance a conduit 24, and
    c. it permits of providing a single and common access to the inner space of casing 23 for cleaning operations or replacing the light sources 6.
2. As already mentioned in the foregoing and illustrated in FIG. 1, the provision of reflecting mirrors 15 permits the beams to converge towards a single common illuminated field 14. The axes such as 18 and 19 of these beams are distributed among the generatrices of a cone having its apex 17 centered to the illuminated field 14, the angle of aperture of said cone, determined by said axes 18 and 19, thereby reducing the cast shadows.
3. As the reflecting surfaces of mirrors 15 consist of a complex system of thin interferential layers, the mirrors are capable of selectively reflecting the light power radiated from the source. More particularly, according to this preferred form of embodiment, the thermal energy is transmitted and only the light energy or candlepower is reflected.

The thermal energy may be collected by a radiator 16 or equivalent means capable of dissipating the heat.

4. By properly adjusting their inclination to the initial axis 20 of the light beam, the mirrors 15 permit focusing the light power in the lighted plane 14, for example between the limits shown diagrammatically at plane levels 21 and 22.

Although a specific embodiment has been described hereinabove with reference to the attached drawings, it will be readily understood by those conversant with the art that various modfications and variations may be brought thereto without departing from the basic principle of the invention as set forth in the appended claims.

What we claim is:

1. A lighting projector, particularly for operating room use, comprising a star-shaped arrangement including a plurality of basic elements, disposed circumferentially at intervals from a common center, said basic elements each comprising a light source for producing a light beam, a frosted zone in close proximity to said light source and illuminated by said light source, a wide-apertured optical condensing system in the path of said light beam for concentrating said beam onto an intense beam of relatively narrow cross-section, and a concave mirror located opposite said condensing system and reflecting at least a portion of said light beam, and a reflecting mirror and an optical element in the path of said intense beam and forming the image of said frosted zone on a plane field of illumination.

2. A lighting projector as defined in claim 1, wherein said basic elements have an outer peripheral end, and wherein said reflecting mirror is disposed at said outer peripheral end of each of said basic elements, and is inclined from the plane of said basic elements so that said light beams reflected by said reflecting mirror converge on said plane field of illumination, and wherein the axes of said reflected beams are coincident with the generatrices of a common cone having its apex coincident with the center of said plane field of illumination.

3. A lighting projector as defined in claim 1, wherein said light source of said basic elements comprise a common central casing.

4. A lighting projector as defined in claim 1, wherein said basic elements have an outer peripheral end, and wherein said reflecting mirror is disposed at said outer peripheral end at each of said basic elements, said mirror comprising a system of thin interferential layers, for selectively reflecting said light beams radiated from said light source.

5. A lighting projector as defined in claim 4, wherein said light sources of said basic elements comprise a common central casing, and each basic element comprises a tubular case extending in radial direction at spaced angular intervals around said common central casing.

* * * * *

UNITED STATES PATENT AND TRADEMARK OFFICE
CERTIFICATE OF CORRECTION

PATENT NO. : 3,848,119
DATED : November 12, 1974
INVENTOR(S) : Andre Masson et al.

It is certified that error appears in the above-identified patent and that said Letters Patent are hereby corrected as shown below:

In the heading [73], the name of the assignee should read -- Etablissements Pierre Angenieux --.

In the heading [30], the Foreign Application Priority Data should read -- July 27, 1972   Luxemburg ........ 65 808 --.

Signed and Sealed this

Fifteenth Day of March 1977

[SEAL]

Attest:

RUTH C. MASON
Attesting Officer

C. MARSHALL DANN
Commissioner of Patents and Trademarks